United States Patent
Kang (10) Patent No.: US 12,111,221 B2
(45) Date of Patent: Oct. 8, 2024

(54) DYNAMIC TORQUE SENSING DEVICE OF THREAD-ON FREEWHEEL STRUCTURE

(71) Applicant: KCLAMBER ELECTRIC TECHNOLOGY CORP, Jiangsu (CN)

(72) Inventor: Xianbing Kang, Jiangsu (CN)

(73) Assignee: KCLAMBER ELECTRIC TECHNOLOGY CORP (CN)

(*) Notice: Subject to any disclaimer, the term of this patent is extended or adjusted under 35 U.S.C. 154(b) by 475 days.

(21) Appl. No.: 17/608,200

(22) PCT Filed: Oct. 30, 2019

(86) PCT No.: PCT/CN2019/114277
§ 371 (c)(1),
(2) Date: May 12, 2022

(87) PCT Pub. No.: WO2020/224202
PCT Pub. Date: Nov. 12, 2020

(65) Prior Publication Data
US 2022/0299388 A1 Sep. 22, 2022

(30) Foreign Application Priority Data
May 5, 2019 (CN) .......................... 201920625117.7

(51) Int. Cl.
*G01L 5/22* (2006.01)
*G01L 3/08* (2006.01)
(Continued)

(52) U.S. Cl.
CPC ................ *G01L 3/105* (2013.01); *G01L 3/08* (2013.01); *G01L 5/0038* (2013.01); *G01L 5/225* (2013.01)

(58) Field of Classification Search
CPC ......... G01L 3/105; G01L 3/08; G01L 5/0038; G01L 5/225; G01L 3/104; G01L 3/108;
(Continued)

(56) References Cited

U.S. PATENT DOCUMENTS 6,418,797 B1 * 7/2002 Ambrosina ............... B62M 6/45
73/862.29
6,644,135 B1 * 11/2003 Kishimoto ............... B62M 6/50
73/862.338
(Continued)

FOREIGN PATENT DOCUMENTS

| CN | 203581299 | 5/2014 |
| CN | 106627964 | 5/2017 |

(Continued)

OTHER PUBLICATIONS

European Office Action dated Dec. 8, 2022; European Patent Application No. 19927813.6.
(Continued)

*Primary Examiner* — David J Bolduc
(74) *Attorney, Agent, or Firm* — McDonald Hopkins LLC (57) ABSTRACT

A dynamic torque sensing device of a thread-on freewheel structure includes a thread-on freewheel sensing body (1), a stationary housing (2) and a sensor (12). The thread-on freewheel sensing body and the stationary housing are rotatable relative to each other, and the sensor is configured to sense a torque of the thread-on freewheel sensing body. The thread-on freewheel sensing body includes a thread-on freewheel sensing body relatively stationary portion (101), a thread-on freewheel sensing body relatively rotating portion (102) and a thread-on freewheel sensing body intermediary portion (103). The thread-on freewheel sensing body relatively stationary portion, the thread-on freewheel sensing body intermediary portion and the thread-on freewheel sensing body relatively rotating portion are sequentially
(Continued)

arranged along an axial direction of the thread-on freewheel sensing body. The thread-on freewheel sensing body intermediary portion is configured to connect the thread-on freewheel sensing body relatively stationary portion to the thread-on freewheel sensing body relatively rotating portion.

15 Claims, 5 Drawing Sheets

(51) Int. Cl.
*G01L 3/10* (2006.01)
*G01L 5/00* (2006.01)

(58) Field of Classification Search
CPC .. G01L 3/1435; B60B 27/0068; B62J 45/411; B62M 6/50; B62M 6/65
See application file for complete search history.

(56) References Cited

U.S. PATENT DOCUMENTS

| | | | | |
|---|---|---|---|---|
| 7,047,817 | B2* | 5/2006 | Lanham | G01L 3/1457 73/773 |
| 7,806,006 | B2* | 10/2010 | Phillips | G01L 3/242 73/379.07 |
| 8,065,926 | B2* | 11/2011 | Meyer | G01L 3/1478 73/862.627 |
| 8,091,674 | B1 | 1/2012 | Zhang | B62J 45/421 180/205.1 |
| 8,607,647 | B1* | 12/2013 | Wilson | G01L 3/242 73/862.08 |
| 8,825,279 | B2 | 9/2014 | Kitamura | B62J 45/411 701/33.1 |
| 9,003,900 | B2* | 4/2015 | Hsiao | B62K 25/02 73/862.69 |
| 9,341,526 | B2* | 5/2016 | Bass | B62J 45/42 |
| 9,354,131 | B2* | 5/2016 | Lubarsky | G01L 3/242 |
| 10,610,725 | B2* | 4/2020 | Schaefer | G16H 20/30 |
| 2005/0275561 | A1* | 12/2005 | Kolda | B60B 27/023 340/870.07 |
| 2009/0119032 | A1* | 5/2009 | Meyer | B62J 45/421 702/44 |
| 2009/0120210 | A1* | 5/2009 | Phillips | G01L 3/242 73/862.338 |
| 2010/0093494 | A1* | 4/2010 | Smith | B62M 3/003 482/8 |
| 2012/0022800 | A1* | 1/2012 | Lubarsky | G01L 3/1421 702/41 |
| 2012/0204658 | A1* | 8/2012 | Mercat | G01L 3/1457 73/862.338 |
| 2012/0304783 | A1* | 12/2012 | Kitamura | B60B 27/023 73/862.49 |
| 2013/0024137 | A1* | 1/2013 | Grassi | G01L 1/00 702/43 |
| 2013/0049444 | A1* | 2/2013 | Kitamura | B62J 45/423 301/110.5 |
| 2013/0049446 | A1* | 2/2013 | Kitamura | B62M 9/10 301/110.5 |
| 2013/0049447 | A1* | 2/2013 | Kitamura | B62M 9/10 301/110.5 |
| 2013/0049448 | A1* | 2/2013 | Kitamura | B60B 27/0068 301/110.5 |
| 2014/0074348 | A1* | 3/2014 | Kitamura | B62M 6/50 701/33.1 |
| 2014/0202262 | A1 | 7/2014 | Mercat et al. | |
| 2015/0311954 | A1* | 10/2015 | Tetsuka | H02J 50/10 307/104 |
| 2016/0075177 | A1* | 3/2016 | Biderman | B60L 58/21 301/6.5 |
| 2016/0107720 | A1* | 4/2016 | Xu | B62M 6/50 475/4 |
| 2016/0209281 | A1* | 7/2016 | Carrasco Vergara | G01L 3/242 |
| 2017/0368871 | A1* | 12/2017 | Ebersbach | B62J 45/411 |
| 2018/0292276 | A1* | 10/2018 | Chen | G01L 3/14 |
| 2022/0099508 | A1* | 3/2022 | Kang | G01L 3/108 |

FOREIGN PATENT DOCUMENTS

| | | |
|---|---|---|
| CN | 207603394 U | 7/2018 |
| CN | 109421882 | 3/2019 |
| CN | 109572916 | 4/2019 |
| CN | 109649569 | 4/2019 |
| EP | 3912897 A1 | 11/2021 |

OTHER PUBLICATIONS

Patent Cooperation Treaty (PCT), International Search Report and Written Opinion for Application PCT/CN2019/114277 filed on Oct. 30, 2019, mailed Jan. 23, 2020, International Searching Authority, CN.

* cited by examiner

DYNAMIC TORQUE SENSING DEVICE OF THREAD-ON FREEWHEEL STRUCTURE

CROSS-REFERENCE TO RELATED APPLICATIONS

This application is a U.S. National Stage Application, filed under 35 U.S.C. 371 of International Patent Application No. PCT/CN2019/114277 filed Oct. 30, 2019, which claims priority to Chinese Patent Application No. 201920625117.7 filed with the China National Intellectual Property Administration (CNIPA) on May 5, 2019, the disclosures of each of which are incorporated herein by reference in their entireties.

TECHNICAL FIELD

The present disclosure relates to the application field of torque sensors, for example, a dynamic torque sensing device of a thread-on freewheel structure.

BACKGROUND

With an increasing demand on intelligent travel, a torque sensor is becoming more and more popular. At present, the torque sensor is more and more inclined to be arranged inside a motor so that wiring and assembly of a whole vehicle are easier and cleaner. For example, Chinese Patent Application No. 2017214339570 published on Jul. 10, 2018 provides a motor having a built-in dynamic torque sensing and measuring device, where a dynamic torque sensor is arranged inside the motor. However, this technical solution comes with the following problem:

after the sensor is installed into the whole vehicle, a signal variation of the torque sensor will be affected by a different weight of the rider and a different rotation angle of the sensor during the ride so that the sensor cannot measure the true pedaling force.

SUMMARY

The present disclosure provides a dynamic torque sensing device in a thread-on freewheel structure. Since the device is not affected by the rider weight or vehicle unladen weight, the device can measure the precise pedaling force.

A dynamic torque sensing device in a thread-on freewheel structure includes a thread-on freewheel sensing body, a stationary housing and a sensor, where the thread-on freewheel sensing body and the stationary housing are rotatable relative to each other, and the sensor is configured to measure a torque of the sensing body.

The sensing body includes a thread-on freewheel sensing body relatively stationary portion, a thread-on freewheel sensing body relatively rotating portion and a thread-on freewheel sensing body intermediary portion, where the thread-on freewheel sensing body relatively stationary portion, the thread-on freewheel sensing body intermediary portion and the thread-on freewheel sensing body relatively rotating portion are sequentially arranged along an axial direction of the thread-on freewheel sensing body, and the thread-on freewheel sensing body intermediary portion is configured to connect the thread-on freewheel sensing body relatively stationary portion to the thread-on freewheel sensing body relatively rotating portion.

The thread-on freewheel sensing body relatively stationary portion, the thread-on freewheel sensing body relatively rotating portion and the thread-on freewheel sensing body intermediary portion are coaxial annular structures.

An inner cavity of the thread-on freewheel sensing body relatively stationary portion is provided with a bearing.

An inner cavity of the thread-on freewheel sensing body relatively rotating portion is provided with a bearing.

The sensor is a deformation sensing sensor which is disposed in the thread-on freewheel sensing body intermediary portion.

The sensor includes a torque sensing Hall and a torque sensing magnet; where the torque sensing Hall and the torque sensing magnet are disposed in the thread-on freewheel sensing body relatively stationary portion and the thread-on freewheel sensing body relatively rotating portion respectively, or the torque sensing Hall and the torque sensing magnet are disposed in the thread-on freewheel sensing body relatively rotating portion and the thread-on freewheel sensing body relatively stationary portion respectively.

The dynamic torque sensing device of the thread-on freewheel structure further includes an inductor primary control circuit and an inductor secondary control circuit.

The inductor primary control circuit is fixed to the stationary housing and provided with an infrared receiver; and the inductor secondary control circuit is connected to the thread-on freewheel sensing body and provided with an infrared emitter.

The dynamic torque sensing device of the thread-on freewheel structure further includes a primary induction coil and a secondary induction coil, where the primary induction coil is electrically connected to the inductor primary control circuit, and the secondary induction coil is electrically connected to the inductor secondary control circuit.

The dynamic torque sensing device of the thread-on freewheel structure further includes two electromagnetic shields, where the two electromagnetic shields are disposed on an outer side of the secondary induction coil and an outer side of the primary induction coil respectively.

The sensor is electrically connected to the inductor secondary control circuit.

An outer surface of the stationary housing is provided with a signal wire hole, and a signal wire is electrically connected to the inductor primary control circuit through the signal wire hole. Two ends of the thread-on freewheel sensing body are connected to an axle shaft through the bearings, and an inner surface of a hole of the stationary housing mating with the axle shaft is provided with a stationary housing positioning portion.

The dynamic torque sensing device of the thread-on freewheel structure provided by the present disclosure is designed as a modular device. The structure of the thread-on freewheel sensing body is improved so that the thread-on freewheel sensing body intermediary portion is not affected by the rider weight and the vehicle unladen weight, and thus the device can truly reflect the pedaling force. Featuring a simpler structure, the device can be assembled to a rear motor or a rear hub of a bicycle with higher compatibility.

REFERENCE LIST 1 thread-on freewheel sensing body
101 thread-on freewheel sensing body relatively stationary portion
102 thread-on freewheel sensing body relatively rotating portion
103 thread-on freewheel sensing body intermediary portion
104 bolt hole
2 stationary housing
201 stationary housing positioning portion
202 signal wire hole
3 inductor primary control circuit
4 infrared receiver
5 electromagnetic shield
6 primary induction coil
7 secondary induction coil
8 signal wire
9 inductor secondary control circuit
10 infrared emitter
11a bearing
11b bearing
12 sensor
20 axle shaft

DETAILED DESCRIPTION

Technical solutions of the present disclosure are described below in conjunction with drawings and embodiments.

As shown in FIGS. 1 to 7, a dynamic torque sensing device of a thread-on freewheel structure in the present example includes a thread-on freewheel sensing body 1, a stationary housing 2 and a sensor 12. The sensor 12 is configured to sense a torque of the thread-on freewheel sensing body 1. The thread-on freewheel sensing body 1 and the stationary housing 2 are rotatable relative to each other. For example, when the dynamic torque sensing device of the thread-on freewheel structure is disposed on a motor, the thread-on freewheel sensing body 1 is connected to a rotor of the motor and rotates with the rotor of the motor, and the stationary housing 2 is connected to a stator of the motor and relatively fixed and stationary.

The dynamic torque sensing device of the thread-on freewheel structure in the present example may also be disposed on a rear hub of a bicycle, an electric bicycle, fitness equipment or the like.

The thread-on freewheel sensing body 1 includes a thread-on freewheel sensing body relatively stationary portion 101, a thread-on freewheel sensing body relatively rotating portion 102 and a thread-on freewheel sensing body intermediary portion 103. The thread-on freewheel sensing body relatively stationary portion 101, the thread-on freewheel sensing body relatively rotating portion 102 and the thread-on freewheel sensing body intermediary portion 103 are all annular structures. The thread-on freewheel sensing body relatively stationary portion 101, the thread-on freewheel sensing body intermediary portion 103 and the thread-on freewheel sensing body relatively rotating portion 102 are sequentially arranged along an axial direction of the thread-on freewheel sensing body 1, and the thread-on freewheel sensing body intermediary portion 103 is configured to connect the thread-on freewheel sensing body relatively stationary portion 101 to the thread-on freewheel sensing body relatively rotating portion 102. An inner cavity of the thread-on freewheel sensing body relatively stationary portion 101 is provided with a bearing 11a. An inner cavity of the thread-on freewheel sensing body relatively rotating portion 102 is provided with a bearing 11b. The thread-on freewheel sensing body relatively stationary portion 101 and the thread-on freewheel sensing body relatively rotating portion 102 are rotatable with the bearing 11a and the bearing 11b, respectively.

Figure 1:
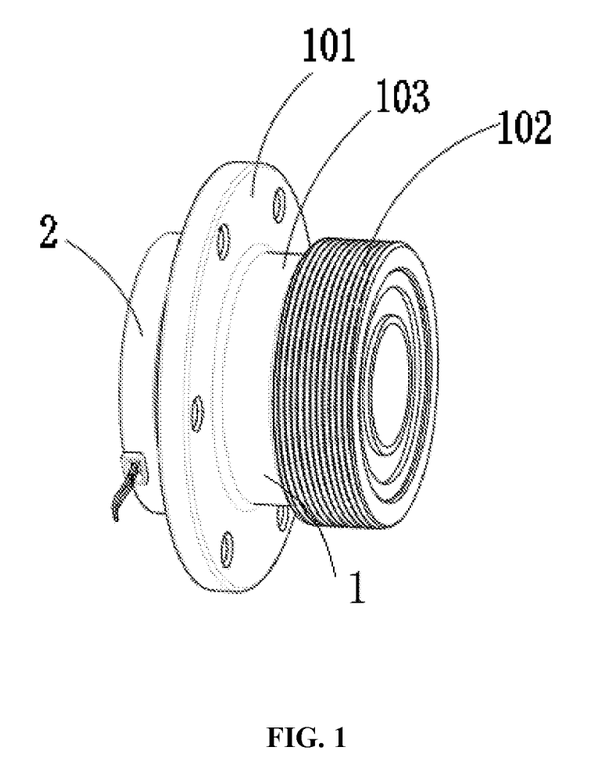
FIG. 1 is a structure view of a dynamic torque sensing device of a thread-on freewheel structure according to an embodiment of the present disclosure.
Figure 4:
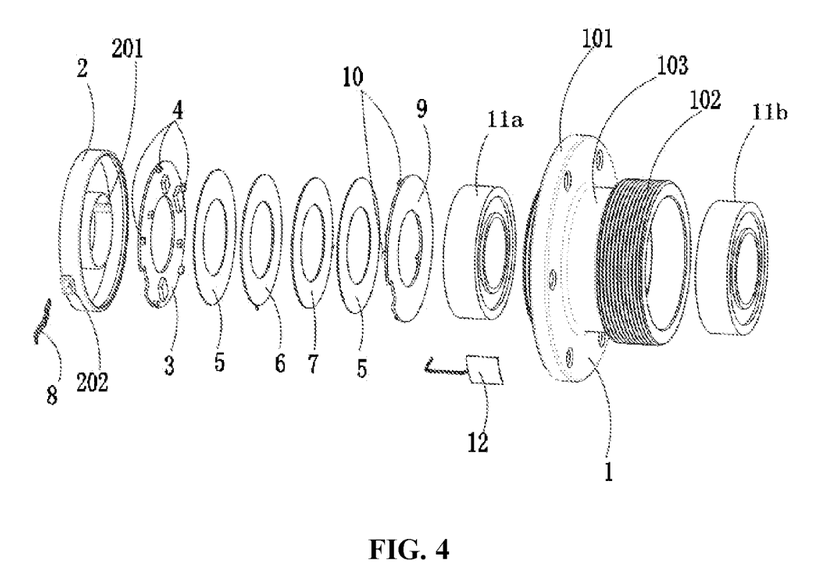
FIG. 4 is an exploded view of a dynamic torque sensing device of a thread-on freewheel structure according to an embodiment of the present disclosure.
Figure 5:
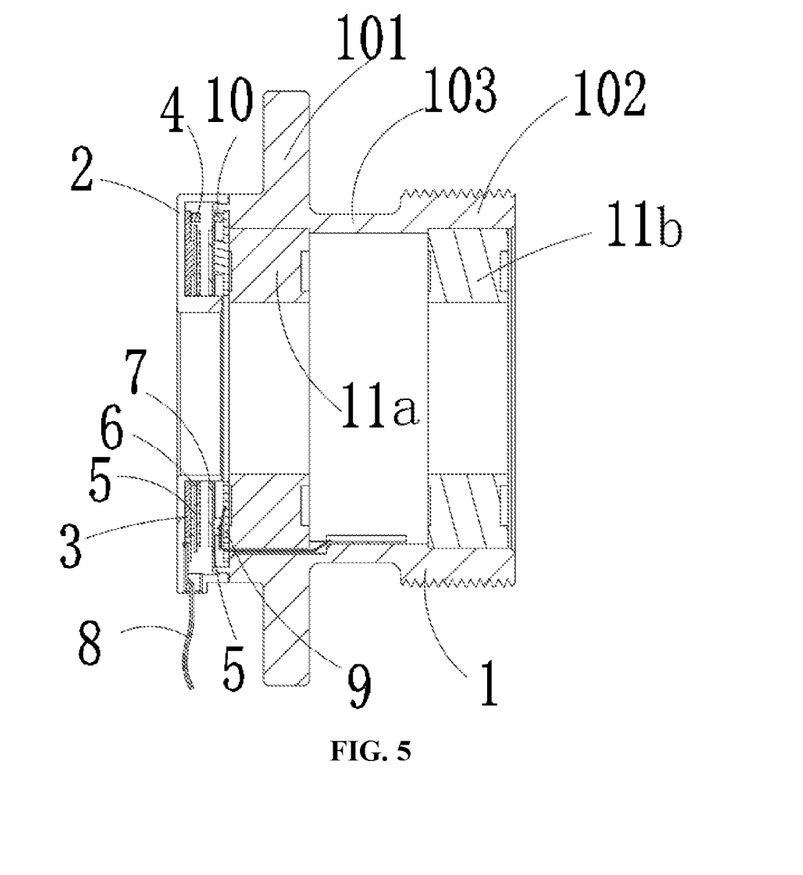
FIG. 5 is a sectional view of a dynamic torque sensing device of a thread-on freewheel structure according to an embodiment of the present disclosure.
Figure 6:
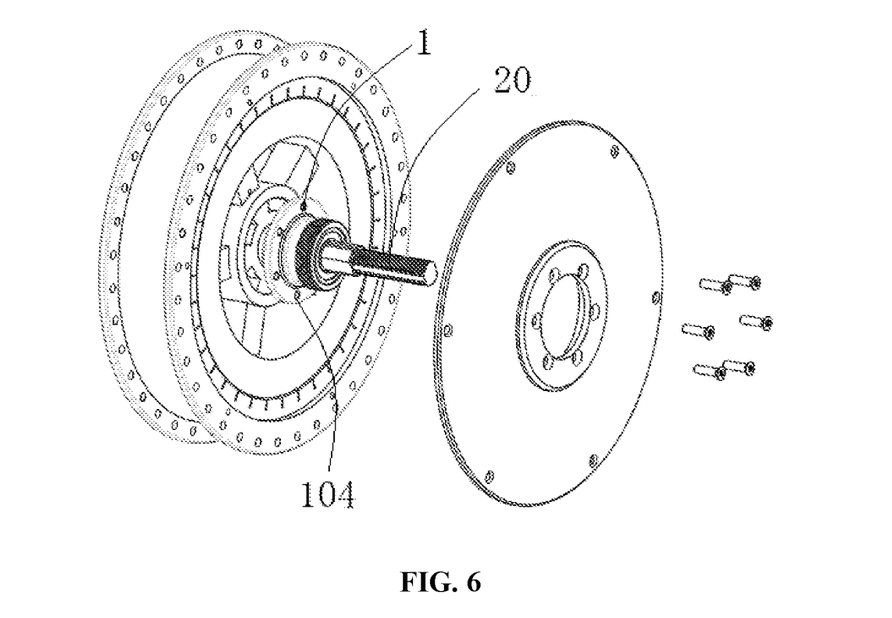
FIG. 6 is a schematic view of an installation mode of a dynamic torque sensing device of a thread-on freewheel structure according to an embodiment of the present disclosure.
Figure 7:
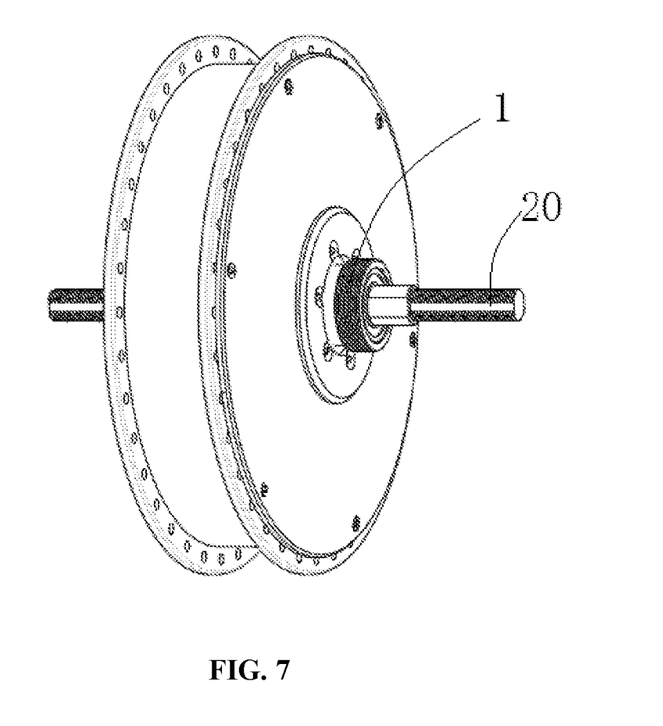
FIG. 7 is a schematic view of a usage mode of a dynamic torque sensing device of a thread-on freewheel structure according to an embodiment of the present disclosure.

When the thread-on freewheel sensing body 1 is subjected to external forces from a rider weight, a vehicle unladen weight, a chain tension and the like, all the external forces received by the thread-on freewheel sensing body relatively stationary portion 101 and the thread-on freewheel sensing body relatively rotating portion 102 are transmitted to an axle shaft 20 of a rear wheel by the two bearings so that the thread-on freewheel sensing body intermediary portion 103 is not affected by the external forces from the rider weight, the vehicle unladen weight, the chain tension and the like. The thread-on freewheel sensing body relatively stationary portion 101 is provided with threaded holes 104 for the connection with an external rotation mechanism which may be a motor end cover a rear wheel hub. In other embodiments, the thread-on freewheel sensing body relatively stationary portion 101 may also be connected to the external rotation mechanism through splines or the like. In the present embodiment, the thread-on freewheel sensing body relatively rotating portion 102 is provided with, as a load connection portion, a thread on its outer surface to be connected to an external load which may be a thread-on freewheel. In other embodiments, the thread-on freewheel sensing body relatively rotating portion 102 may also be connected to the external load through splines or the like.

In the present embodiment, the sensor 12 is a deformation sensing sensor which is disposed in the thread-on freewheel sensing body intermediary portion 103. The deformation sensing sensor may be a resistive strain gauge.

In other embodiments, the sensor 12 may be a combination of a torque sensing Hall and a torque sensing magnet. The torque sensing Hall and the torque sensing magnet are disposed in the thread-on freewheel sensing body relatively stationary portion 101 and the thread-on freewheel sensing body relatively rotating portion 102 respectively, or the torque sensing Hall and the torque sensing magnet are disposed in the thread-on freewheel sensing body relatively rotating portion 102 and the thread-on freewheel sensing body relatively stationary portion 101 respectively. As long as there's slight relative movement between the torque sensing Hall and the torque sensing magnet, the torque sensing Hall can sense a change in a magnetic field of the torque sensing magnet and convert the change into an electrical signal.

Figure 2:
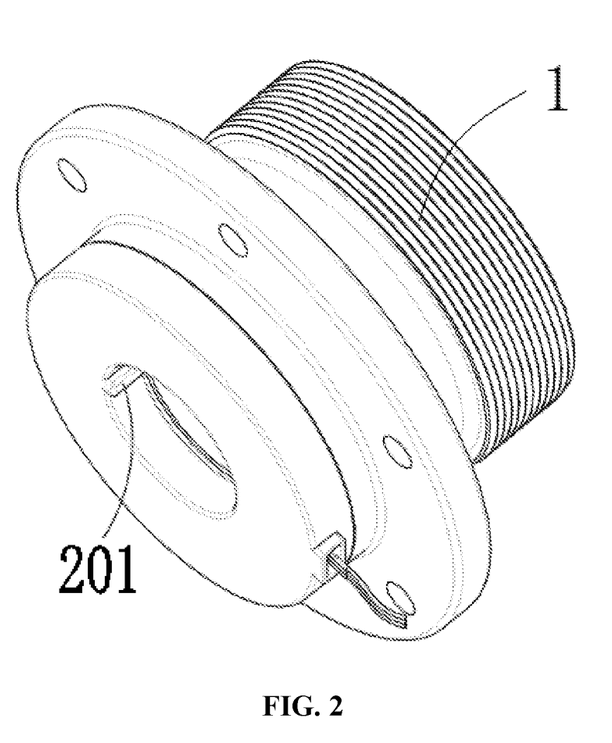
FIG. 2 is a schematic view of FIG. 1 from another angle.
Figure 3:
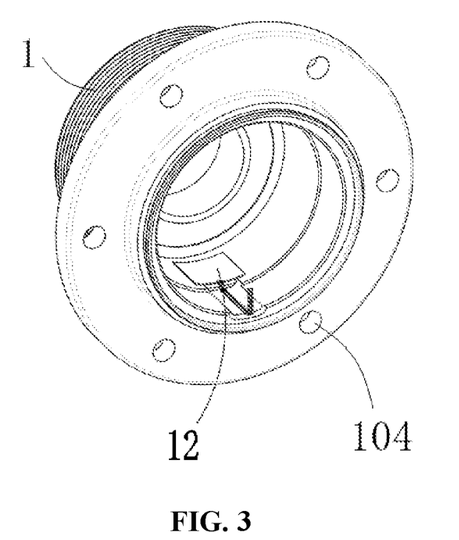
FIG. 3 is a partial structure view of FIG. 1.

As shown in FIG. 2, the stationary housing 2 is an annular housing, and an inner surface of a hole of the annular housing for mating with the axle shaft 20 is provided with a stationary housing positioning portion 201. The stationary housing positioning portion 201 is elongated in shape and configured to constrain rotation of the stationary housing 2. As shown in FIG. 4, an outer surface of the stationary housing 2 is provided with a signal wire hole 202. A signal wire 8 is electrically connected to an inductor primary control circuit 3 through the signal wire hole 202.

The dynamic torque sensing device of the thread-on freewheel structure in the present embodiment further includes the inductor primary control circuit 3 and an inductor secondary control circuit 9.

The inductor primary control circuit 3 is fixed to the stationary housing 2 and provided with an infrared receiver 4. The inductor secondary control circuit 9 is connected to the thread-on freewheel sensing body 1 and provided with an infrared emitter 10. A signal is transmitted between the inductor primary control circuit 3 and the inductor secondary control circuit 9 through the infrared receiver 4 and the infrared emitter 10. The emitted light may be visible light or invisible light. In the present embodiment, the emitted light is the invisible light, that is, infrared light is used for data transmission, which is low in cost. The signal wire 8 is electrically connected to the inductor primary control circuit 3.

In another embodiment, the dynamic torque sensing device of the thread-on freewheel structure includes a primary induction coil 6 and a secondary induction coil 7. The secondary induction coil 7 and the primary induction coil 6 are disposed adjacent to each other. The primary induction coil 6 is electrically connected to the inductor primary control circuit 3, and the secondary induction coil 7 is electrically connected to the inductor secondary control circuit 9. A wireless signal is transmitted between the primary induction coil 6 and the secondary induction coil 7. A power supply mode of the inductor secondary control circuit 9 includes that the inductor secondary control circuit 9 supplies electric energy through its own generator, a battery or wireless transmission. Alternatively, the inductor secondary control circuit 9 supplies the electric energy through wireless electric energy transmission between the secondary induction coil 7 and the primary induction coil 6. Specifically, the electric energy may be wirelessly transmitted through resonant coupling.

The dynamic torque sensing device of the thread-on freewheel structure in the present embodiment further includes an electromagnetic shield 5. Two electromagnetic shields 5 are respectively provided on an outer side of the secondary induction coil 7 and an outer side of the primary induction coil 6 and configured to respectively isolate the primary induction coil 6 and the secondary induction coil 7 from external electromagnetic interference, so as to improve energy transmission of the coils.

The sensor 12 is electrically connected to the inductor secondary control circuit 9. After the sensor 12 senses a torque signal of the thread-on freewheel sensing body 1, the torque signal is received by the inductor secondary control circuit 9, and then data transmission is performed through the infrared emitter 10 and the infrared receiver 4 or through the secondary induction coil 7 and the primary induction coil 6. After receiving the signal, the inductor primary control circuit 3 processes the data and then outputs the torque signal through the signal wire 8.

The working machanism of the dynamic torque sensing device of the thread-on freewheel structure provided by the present disclosure is described below. During the riding, the rider rotates the chainwheel by pedaling, and the chainwheel drives the thread-on freewheel sensing body relatively rotating portion 102 to rotate through a transmission structure such as a chain or a belt and a thread-on freewheel. The sensor 12 senses a displacement of the thread-on freewheel sensing body relatively rotating portion 102 relative to the thread-on freewheel sensing body relatively stationary portion 101 or the deformation of the thread-on freewheel sensing body intermediary portion 103, and then converts the displacement or the deformation into the pedaling torque signal required by the rider through the inductor secondary control circuit 9 and the inductor primary control circuit 3 in sequence.

The dynamic torque sensing device of the thread-on freewheel structure provided by the present disclosure is designed as a modular device. The structure of the thread-on freewheel sensing body is improved so that the thread-on freewheel sensing body intermediary portion 103 is not affected by the rider weight, the vehicle unladen weight, the chain tension or other external forces, and thus the device can measure the true pedaling force. The device has a simpler structure and can be assembled to a rear motor or a rear hub of a bicycle with higher compatibility.

What is claimed is:

1. A dynamic torque sensing device of a thread-on freewheel structure, comprising a thread-on freewheel sensing body, a stationary housing and a sensor, wherein the thread-on freewheel sensing body and the stationary housing are rotatable relative to each other, and the sensor is configured to sense a torque of the thread-on freewheel sensing body; and wherein the thread-on freewheel sensing body comprises a thread-on freewheel sensing body relatively stationary portion, a thread-on freewheel sensing body relatively rotating portion and a thread-on freewheel sensing body intermediary portion that are integrally formed; wherein the thread-on freewheel sensing body relatively stationary portion, the thread-on freewheel sensing body intermediary portion and the thread-on freewheel sensing body relatively rotating portion are sequentially arranged along an axial direction of the thread-on freewheel sensing body, and the thread-on freewheel sensing body intermediary portion is configured to connect the thread-on freewheel sensing body relatively stationary portion to the thread-on freewheel sensing body relatively rotating portion;

wherein an inner cavity of the thread-on freewheel sensing body relatively stationary portion is provided with a bearing, an inner cavity of the thread-on freewheel sensing body relatively stationary portion is provided with a bearing, and the thread-on freewheel sensing body relatively rotating portion is provided with a thread on its outer surface configured to be connected to an external load.

2. The dynamic torque sensing device of the thread-on freewheel structure according to claim 1, wherein the thread-on freewheel sensing body relatively stationary portion, the thread-on freewheel sensing body relatively rotating portion and the thread-on freewheel sensing body intermediary portion are coaxial annular structures.

3. The dynamic torque sensing device of the thread-on freewheel structure according to claim 1, wherein the sensor is a deformation sensing sensor which is disposed in the thread-on freewheel sensing body intermediary portion.

4. The dynamic torque sensing device of the thread-on freewheel structure according to claim 1, wherein the sensor comprises a torque sensing Hall and a torque sensing magnet;

wherein the torque sensing Hall and the torque sensing magnet are disposed in the thread-on freewheel sensing body relatively stationary portion and the thread-on freewheel sensing body relatively rotating portion respectively, or the torque sensing Hall and the torque sensing magnet are disposed in the thread-on freewheel sensing body relatively rotating portion and the thread-on freewheel sensing body relatively stationary portion respectively.

5. The dynamic torque sensing device of the thread-on freewheel structure according to claim 1, further comprising: an inductor primary control circuit and an inductor secondary control circuit.

6. The dynamic torque sensing device of the thread-on freewheel structure according to claim 5, wherein the inductor primary control circuit is fixed to the stationary housing and provided with an infrared receiver; and the inductor secondary control circuit is connected to the thread-on freewheel sensing body and provided with an infrared emitter.

7. The dynamic torque sensing device of the thread-on freewheel structure according to claim 5, further comprising: a primary induction coil and a secondary induction coil, wherein the primary induction coil is electrically connected to the inductor primary control circuit, and the secondary induction coil is electrically connected to the inductor secondary control circuit.

8. The dynamic torque sensing device of the thread-on freewheel structure according to claim 7, further comprising: two electromagnetic shields, wherein the two electromagnetic shields are disposed on an outer side of the secondary induction coil and an outer side of the primary induction coil respectively.

9. The dynamic torque sensing device of the thread-on freewheel structure according to claim 5, wherein the sensor is electrically connected to the inductor secondary control circuit.

10. The dynamic torque sensing device of the thread-on freewheel structure according to claim 5, wherein an outer surface of the stationary housing is provided with a signal wire hole, and a signal wire is electrically connected to the inductor primary control circuit through the signal wire hole.

11. The dynamic torque sensing device of the thread-on freewheel structure according to claim 1, wherein two ends of the thread-on freewheel sensing body are connected to an axle shaft through the bearings, and an inner surface of a hole of the stationary housing mating with the axle shaft is provided with a stationary housing positioning portion.

12. The dynamic torque sensing device of the thread-on freewheel structure according to claim 2, further comprising: an inductor primary control circuit and an inductor secondary control circuit.

13. The dynamic torque sensing device of the thread-on freewheel structure according to claim 3, further comprising: an inductor primary control circuit and an inductor secondary control circuit.

14. The dynamic torque sensing device of the thread-on freewheel structure according to claim 4, further comprising: an inductor primary control circuit and an inductor secondary control circuit.

15. The dynamic torque sensing device of the thread-on freewheel structure according to claim 6, further comprising: a primary induction coil and a secondary induction coil, wherein the primary induction coil is electrically connected to the inductor primary control circuit, and the secondary induction coil is electrically connected to the inductor secondary control circuit.

* * * * *